United States Patent [19]

Su

[11] Patent Number: 5,713,461
[45] Date of Patent: Feb. 3, 1998

[54] DISK CARRIER

[76] Inventor: Feng-Pai Su, No.242, Tung Shan Chun, Tung Shan Hsiang, Tainan Hsien, Taiwan

[21] Appl. No.: 759,514

[22] Filed: Dec. 4, 1996

[51] Int. Cl.$^6$ .................................................. B65D 85/57
[52] U.S. Cl. .................. 206/303; 206/307.1; 206/308.1; 206/308.3
[58] Field of Search .................. 206/303, 307.1, 206/308.1, 308.3, 310, 311

[56] References Cited

U.S. PATENT DOCUMENTS

| 4,993,552 | 2/1991 | Bugbey et al. | 206/307.1 |
|---|---|---|---|
| 5,176,250 | 1/1993 | Cheng | 206/308.3 |
| 5,180,058 | 1/1993 | Hu | 206/308.3 |
| 5,207,717 | 5/1993 | Manning | 206/308.3 |
| 5,423,424 | 6/1995 | Young, III | 206/308.3 |
| 5,518,112 | 5/1996 | Ono et al. | 206/308.3 |
| 5,531,321 | 7/1996 | O'Brien et al. | 206/310 |
| 5,590,767 | 1/1997 | Li | 206/307.1 |

*Primary Examiner*—Jimmy G. Foster
*Attorney, Agent, or Firm*—Morton J. Rosenberg; David I. Klein; Jun Y. Lee

[57] ABSTRACT

A disk carrier including an upper carrier plate and a lower carrier plate fastened together by hooks, the upper carrier plate and the lower carrier plate defining a diskette holding chamber for holding a diskette, and a front access hole in front of the diskette holding chamber for access to the diskette holding chamber, the upper carrier plate and the lower carrier plate having a respective circular recess at an outer side for holding a compact disk or video disk, and a respective disk keeper raised from the center of the respective circular recess for keeping a compact disk or video disk in the respective circular recess.

1 Claim, 4 Drawing Sheets

DISK CARRIER

BACKGROUND OF THE INVENTION

The present invention relates to a disk carrier for carrying compact disks or video disks, and more particularly to such a disk carrier which has two circular recesses with a respective disk keeper at two opposite sides for holding a respective compact disk or video disk, and a diskette holding chamber in the middle for holding a diskette.

A conventional disk carrier 1, as shown in FIGS. 1 and 2, comprises a circular recess 13 at the top side, a disk keeper 14 raised from the circular recess 13 at the center and adapted for holding a compact disk or video disk in the circular recess 13, two pivots 12 raised from the rear section 11 at two opposite sides and adapted for coupling to a storage case, a circular bottom recess 17 at the bottom side adapted for holding a diskette, a pair of upright hooks 15 and a pair of upright stop rods 16 raised from the bottom side and spaced around the circular bottom recess 17 and adapted for keeping a diskette in the circular bottom recess 17. This structure of disk carrier can only holds one compact disk (or video disk) and one diskette. Furthermore, because the upright hooks 15 and the upright stop rods 16 are respectively raised from the bottom side of the disk carrier 1, the compact disk or video disk which is stored in a second disk carrier at the bottom side tends to be scratched or damaged by the upright hooks 15 and upright stop rods 16 of the disk carrier at the top side.

SUMMARY OF THE INVENTION

The present invention has been accomplished to provide a disk carrier which eliminates the aforesaid drawbacks. It is one object of the present invention to provide a disk carrier which has space for holding compact disks (or video disks) and diskettes. It is another object of the present invention to provide a disk carrier which does not damage storage disks when arranged with other disk carriers together in a stack. According to the preferred embodiment of the present invention, the disk carrier comprises: an upper carrier plate having a plurality of notches spaced around the periphery, a circular top recess at a top side thereof adapted for holding a disk, a disk keeper raised from the circular top recess at the center and adapted for keeping a disk in the circular top recess, and a front finger notch; and a bottom carrier plate coupled to the upper carrier plate and defining with it a front access hole, the bottom carrier plate comprising a circular bottom recess at a bottom side thereof adapted for holding a disk, a disk keeper raised from the circular bottom recess at the center and adapted for keeping a disk in the circular bottom recess, a front finger notch corresponding to the front finger notch of the upper carrier plate and in communication with the front access hole, a plurality of upright hooks respectively hooked on the notches of the upper carrier plate, a transverse upright rail raised from a top side thereof, two longitudinal channel rails bilaterally raised from the top side and defining with the transverse upright rail a diskette holding space below the upper carrier plate for holding a diskette, and two springy retainer strips respectively raised from the top side between the transverse upright rail and the longitudinal channel rails and adapted for holding a diskette in the diskette holding space.

DETAILED DESCRIPTION OF THE PREFERRED EMBODIMENT

Figure 1:
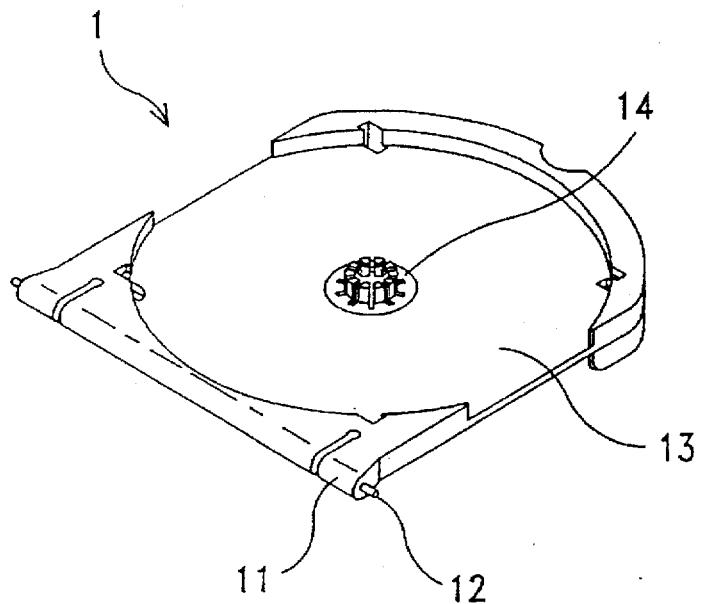
FIG. 1 is a front elevational view of a disk carrier according to the prior art.
Figure 2:
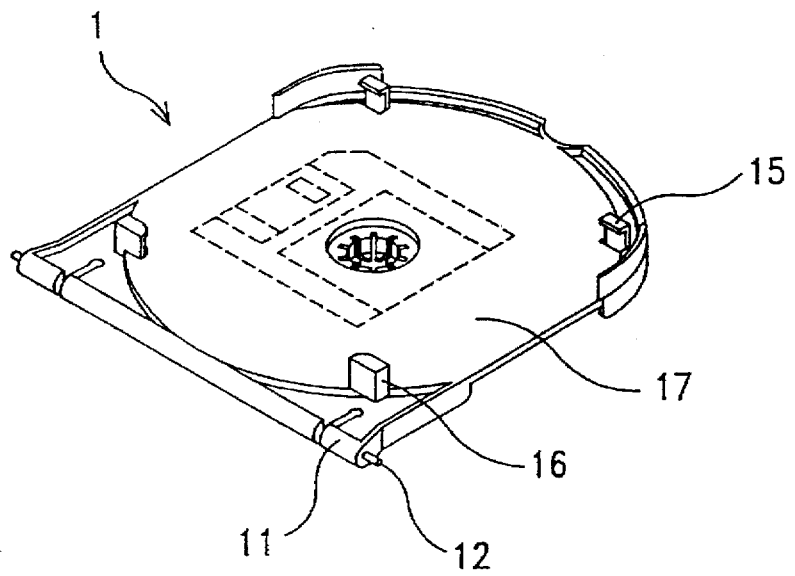
FIG. 2 is a rear elevational view of the disk carrier shown in FIG. 1.
Figure 3:
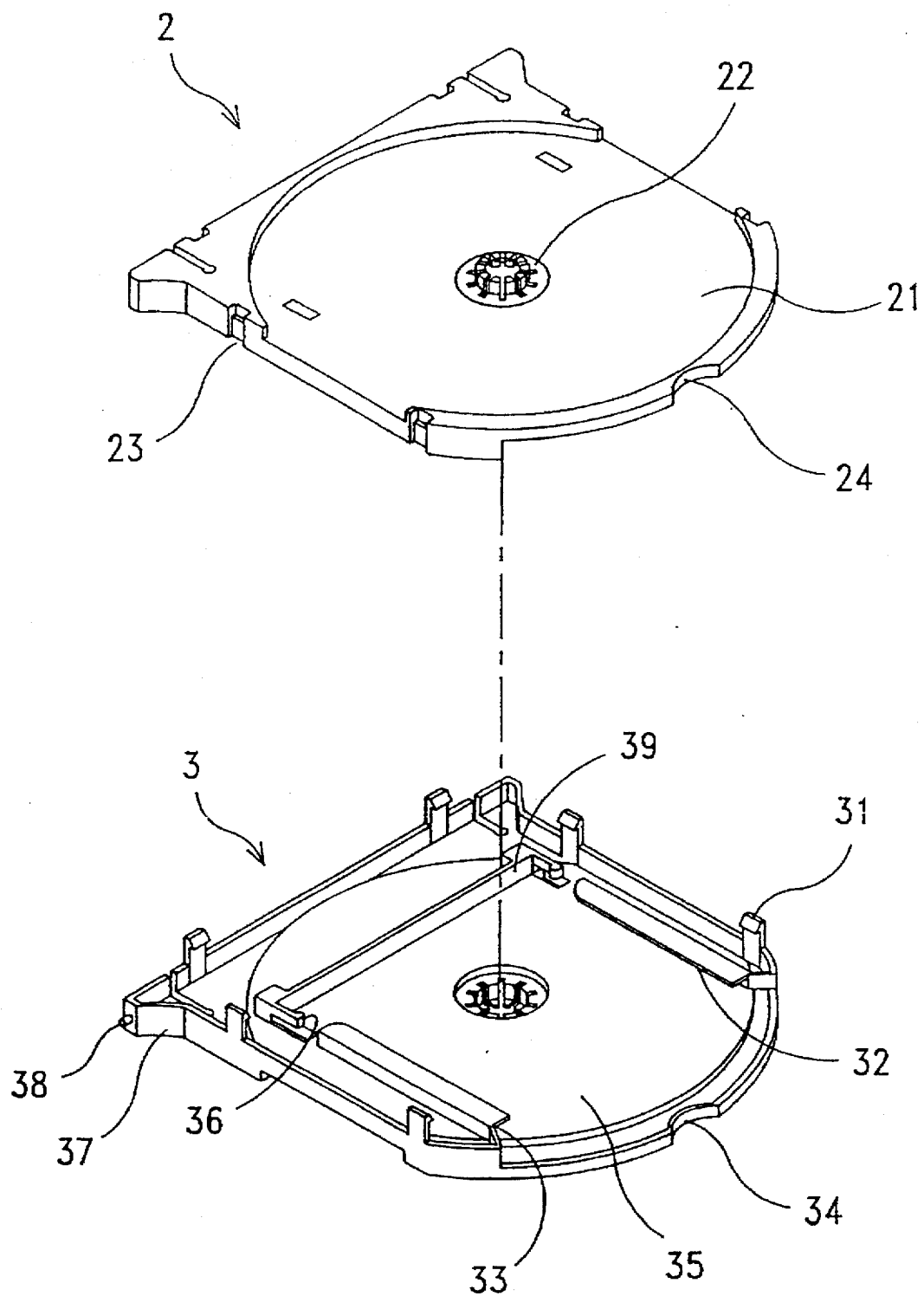
FIG. 3 is an exploded view of a disk carrier according to the present invention.

Referring to FIG. 3, a disk carrier in accordance with the present invention is generally comprised of an upper carrier plate 2 and a bottom carrier plate 3. The upper carrier plate 2 has a plurality of notches 23 spaced around the periphery. The bottom carrier plate 3 has a plurality of upright hooks 31 respectively hooked in the notches 23 of the upper carrier plate 2, and two pivots 38 bilaterally raised from the rear section 37. The upper carrier plate 2 further comprises a circular top recess 21, a disk keeper 22 at the center of the circular top recess 21, and a front finger notch 24. The bottom carrier plate 3 further comprises a transverse upright rail 39 raised from the top near the rear section 37, two longitudinal channel rails 32 bilaterally raised from the top and defining a respective longitudinal channel 33 at an inner side, a diskette holding space 35 defined between the longitudinal channels 33 of the longitudinal channel rails 32 and the transverse upright rail 39 for holding a diskette, a front finger notch 34 corresponding to the front finger notch 24 of the upper carrier plate 2, and two springy retainer strips 36 respectively raised from the top at two opposite sides between the transverse upright rail 39 and the longitudinal channel rails 32 for holding a diskette in the diskette holding space 35. The bottom side of the bottom carrier plate 3 is similar to the top side of the upper carrier plate 2, having a circular bottom recess and a disk keeper at the center of the circular bottom recess for holding a compact disk or video disk.

Figure 4:
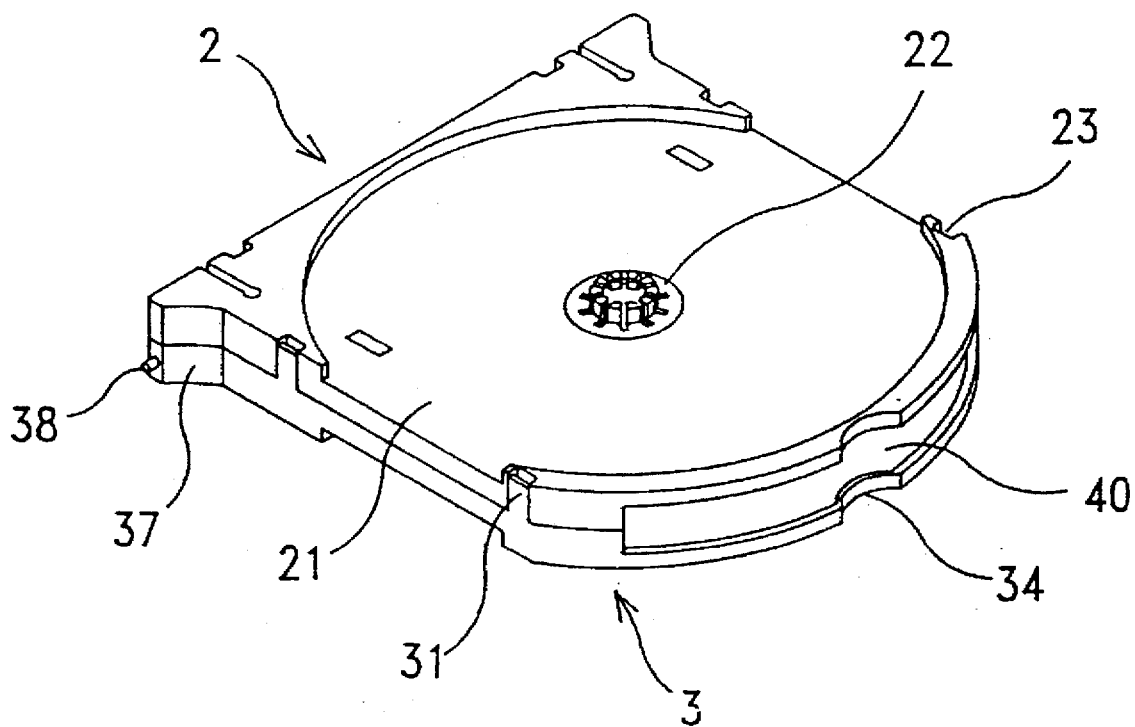
FIG. 4 is an elevational view of the disk carrier shown in FIG. 3.

Referring to FIG. 4 and FIG. 3 again, when the upper carrier plate 2 and the bottom carrier plate 3 are connected together by hooking the upright hooks 31 of the bottom carrier plate 3 on the notches 23 of the upper carrier plate 2, an access hole 40 is defined between the upper carrier plate 2 and the bottom carrier plate 3. Through the access hole 40, a diskette can be inserted into the holding space 35. When a diskette is inserted into the holding space 35, it is immediately retained in place by the springy retainer strips 36 of the bottom carrier plate 3. Furthermore, the circular top recess 21 of the upper carrier plate 2 and the circular bottom recess of the bottom carrier plate 3 are provided for holding a respective compact disk or video disk.

Figure 5:
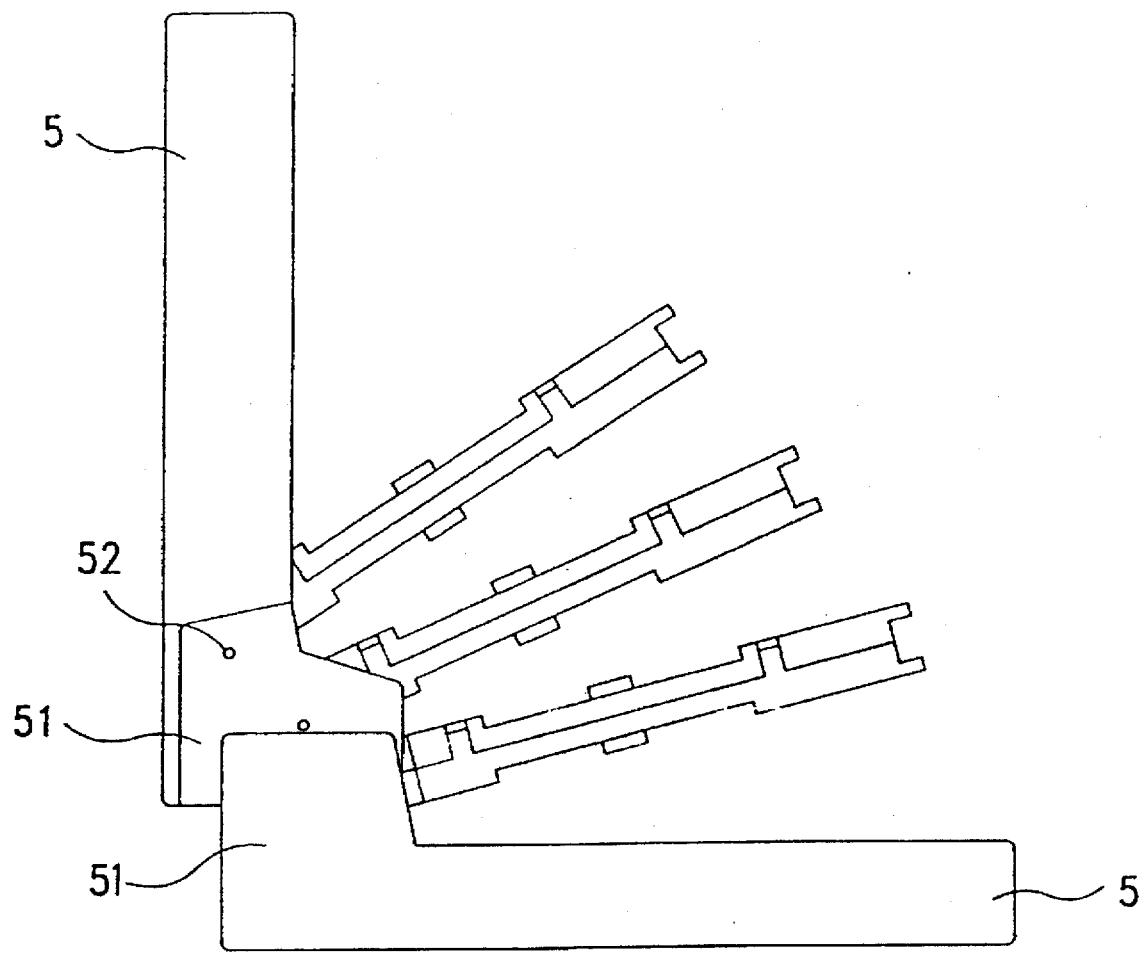
FIG. 5 is a schematic drawing showing a plurality of disk carriers installed in a storage case according to the present invention.

Referring to FIG. 5, the disk carrier can be pivotably mounted in a case 5, by inserting the pivots 38 of the bottom carrier plate 3 into respective pivot holes 52 in a coupling section 51 of the case 5.

It is to be understood that the drawings are designed for purposes of illustration only, and are not intended as a definition of the limits and scope of the invention disclosed.

What the invention claimed is:

1. A disk carrier comprising:
   an upper carrier plate having a plurality of notches spaced around the periphery, a circular top recess at a top side thereof adapted for holding a disk, a disk keeper raised from said circular top recess at the center and adapted for keeping a disk in said circular top recess, and a front finger notch;
   a bottom carrier plate coupled to said upper carrier plate and defining with it a front access hole, said bottom carrier plate comprising a circular bottom recess at a bottom side thereof adapted for holding a disk, a disk keeper raised from said circular bottom recess at the center and adapted for keeping a disk in said circular bottom recess, a front finger notch corresponding to the front finger notch of said upper carrier plate and in communication with said front access hole, a plurality of upright hooks respectively hooked on the notches of said upper carrier plate, a transverse upright rail raised from a top side thereof, two longitudinal channel rails bilaterally raised from the top side and defining with said transverse upright rail a diskette holding space below said upper carrier plate for holding a diskette, and two springy retainer strips respectively raised from the top side between said transverse upright rail and said longitudinal channel rails and adapted for holding a diskette in said diskette holding space.

* * * * *